United States Patent
Pickett

(10) Patent No.: US 6,408,658 B1
(45) Date of Patent: Jun. 25, 2002

(54) HINGED SOLID STEEL JAWED WHEEL LOCK, W/ADJUSTABLE PAD-LOCKABLE HARDENED CHAIN CLOSER

(75) Inventor: Steven Bertus Pickett, 116 Emmons Hill Rd., Oneonta, NY (US) 13820

(73) Assignee: Steven Bertus Pickett, Oneonta, NY (US)

( * ) Notice: Subject to any disclaimer, the term of this patent is extended or adjusted under 35 U.S.C. 154(b) by 0 days.

(21) Appl. No.: 09/388,061

(22) Filed: Aug. 31, 1999

(51) Int. Cl.$^7$ .............................................. E05B 73/00
(52) U.S. Cl. ................... 70/14; 70/19; 70/226; 70/259; 188/32
(58) Field of Search .................. 70/14, 18, 19, 70/225–227, 259, 260; 188/32

(56) References Cited

U.S. PATENT DOCUMENTS

| | | | | |
|---|---|---|---|---|
| 1,149,006 A | * | 8/1915 | Weaver ........................ | 188/32 |
| 1,317,329 A | * | 9/1919 | Shorday ....................... | 188/32 |
| 1,370,364 A | * | 3/1921 | Rodriquez ................... | 155/32 |
| 1,376,114 A | * | 4/1921 | Raney ......................... | 188/32 |
| 1,404,971 A | * | 1/1922 | Faison ..................... | 70/226 X |
| 1,445,623 A | * | 2/1923 | Frode ......................... | 188/32 |
| 1,467,353 A | * | 9/1923 | Childress ................... | 70/226 |
| 1,502,809 A | * | 7/1924 | Connors ..................... | 70/226 |
| 2,844,954 A | * | 7/1958 | Marugg ...................... | 70/225 |
| 2,960,857 A | * | 11/1960 | Winter ......................... | 70/19 |
| 3,026,973 A | * | 3/1962 | Piel ............................ | 188/32 |
| 3,512,380 A | * | 5/1970 | Winter ......................... | 70/19 |
| 3,687,238 A | * | 8/1972 | Carpenter ................ | 70/18 X |
| 3,828,590 A | * | 8/1974 | Thiebault ..................... | 70/19 |
| 3,834,196 A | * | 9/1974 | Stone .......................... | 70/18 |
| 3,845,643 A | * | 11/1974 | Barrett ........................ | 70/18 |
| 3,868,837 A | * | 3/1975 | Quimby ..................... | 70/259 |
| 4,031,983 A | * | 6/1977 | Lentini ....................... | 188/32 |
| 4,164,131 A | * | 8/1979 | Desmond et al. ............ | 70/14 |
| 4,441,586 A | * | 4/1984 | Bernier .................... | 70/19 X |
| 4,582,176 A | * | 4/1986 | Roberts .................. | 70/226 X |
| 4,760,718 A | * | 8/1988 | Muramatsu et al. ......... | 70/18 |
| 4,768,359 A | * | 9/1988 | Wade .......................... | 70/14 |
| 4,913,265 A | * | 4/1990 | Richards ................ | 70/226 X |
| 5,134,868 A | * | 8/1992 | Bethards ................ | 70/226 X |
| 5,197,310 A | * | 3/1993 | Pedersen ................... | 70/227 |
| 5,214,944 A | * | 6/1993 | Wolthoff .................... | 70/226 |
| 5,247,815 A | * | 9/1993 | Caldwell .................... | 70/19 |
| 5,372,018 A | * | 12/1994 | Smith .......................... | 70/18 |
| 5,427,210 A | * | 6/1995 | Willaford .................. | 188/32 |
| 5,520,034 A | * | 5/1996 | Edmonson ................. | 70/226 |
| 5,706,679 A | * | 1/1998 | Zane et al. ................... | 70/18 |
| 5,706,680 A | * | 1/1998 | Wroble ....................... | 70/18 |
| D390,772 S | * | 2/1998 | Hare .......................... | D8/333 |
| 5,787,742 A | * | 8/1998 | Lewis et al. ............ | 70/226 X |
| 5,829,283 A | * | 11/1998 | Zenke ..................... | 70/19 X |
| 5,832,759 A | * | 11/1998 | Yamabe .................... | 70/226 |
| 5,832,760 A | * | 11/1998 | Firmin ...................... | 70/226 |
| 5,862,688 A | * | 1/1999 | Odegard ..................... | 70/19 |
| 5,873,275 A | * | 2/1999 | Lukich ...................... | 70/226 |
| 6,155,086 A | * | 12/2000 | Miller ......................... | 70/14 |

FOREIGN PATENT DOCUMENTS

| | | | | |
|---|---|---|---|---|
| CA | 992345 | * | 7/1976 | ..................... 70/19 |

* cited by examiner

Primary Examiner—Suzanne Dino Barnett

(57) ABSTRACT

A trailer wheel rim lock comprising two steel jaw members hinged together at one end and secured around a wheel rim at the other ends and wherein a chain is fixed to one jaw and passed through a guide member on the other jaw to tighten the jaws together around the wheel rim and a padlock is passed through the chain to lock the chain around the jaws.

1 Claim, 5 Drawing Sheets

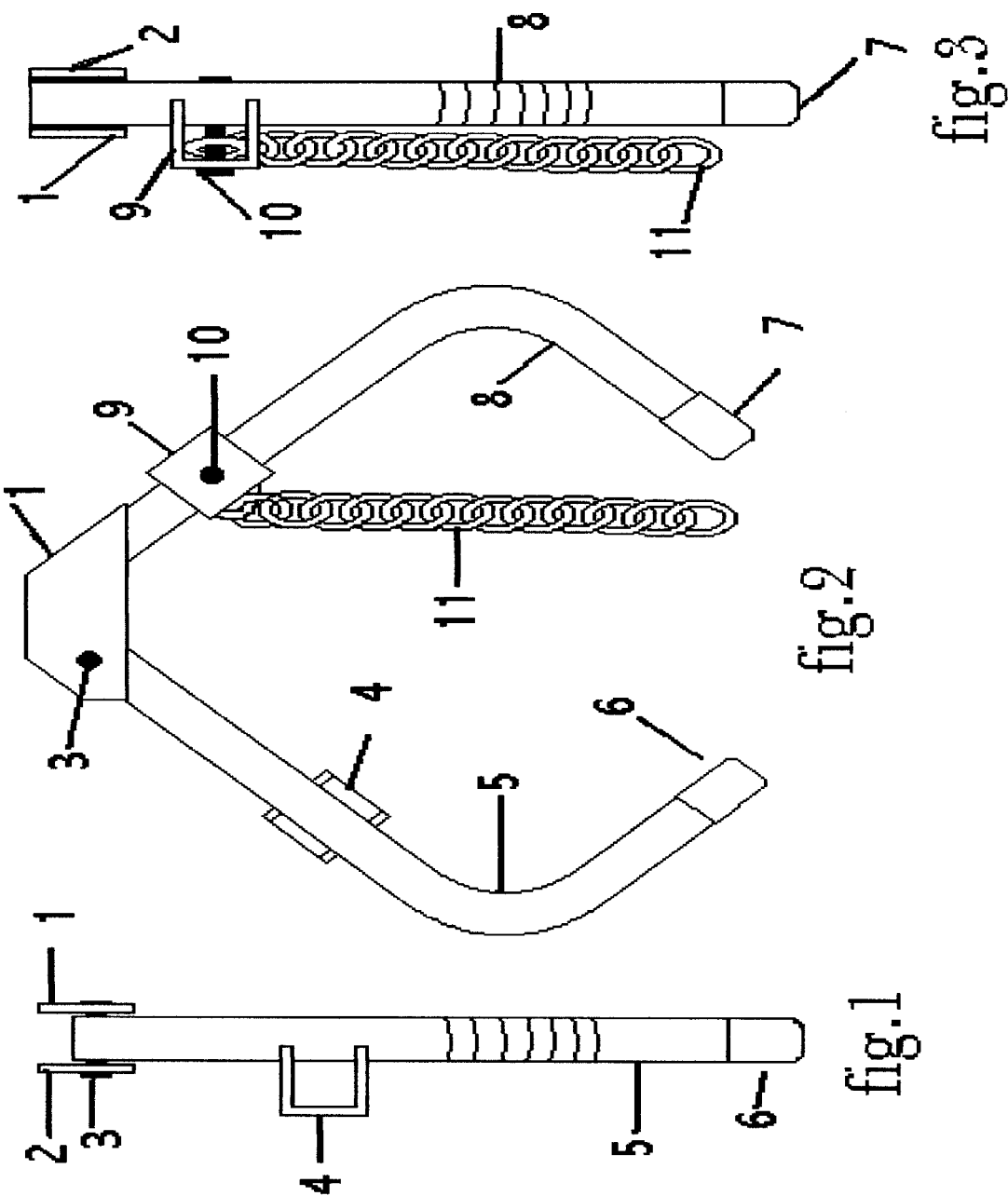

Figure 4:
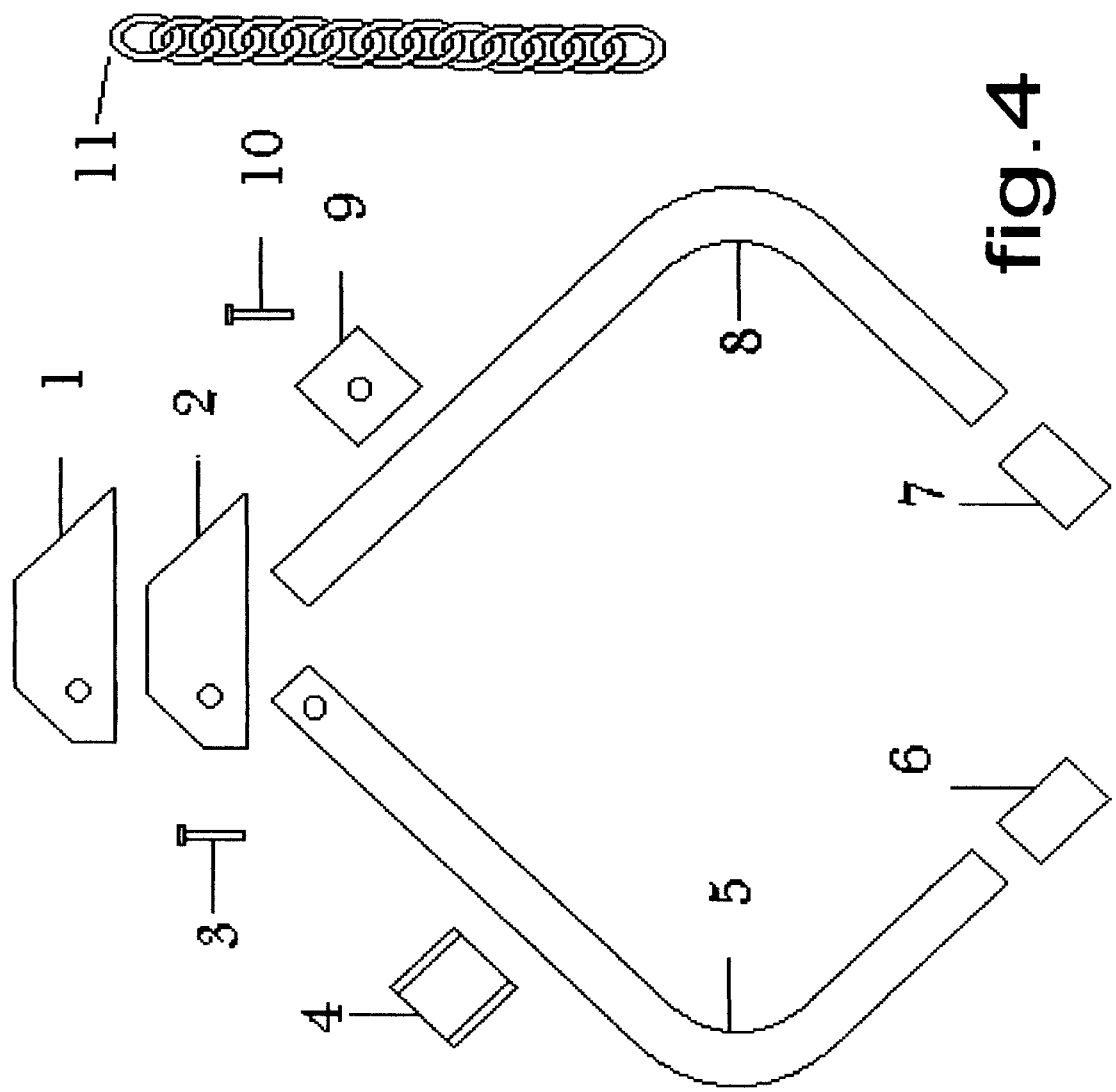

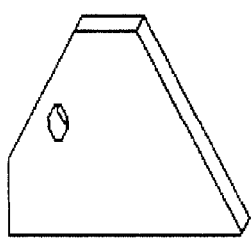
fig. 5
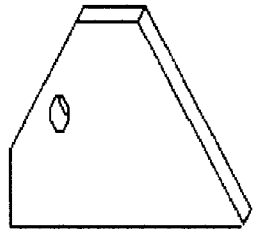
fig. 6
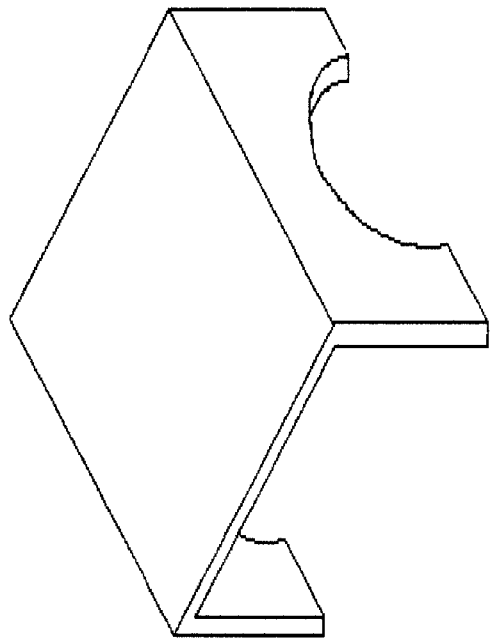
fig. 8
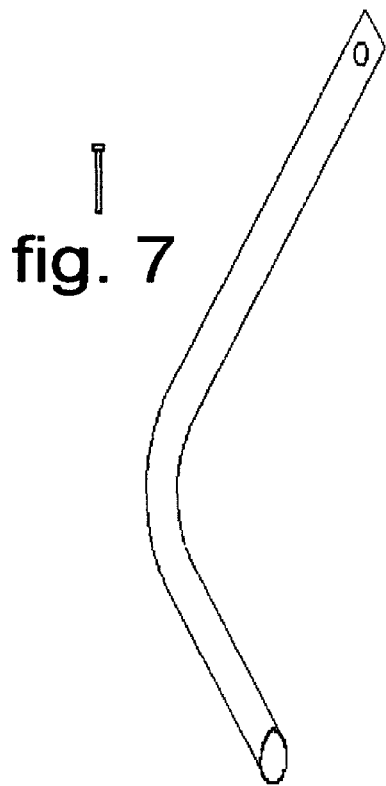
fig. 7
fig. 9
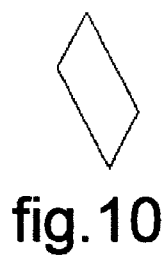
fig. 10
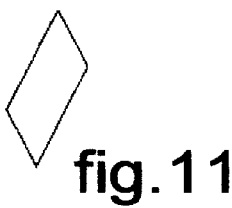
fig. 11

HINGED SOLID STEEL JAWED WHEEL LOCK, W/ADJUSTABLE PAD-LOCKABLE HARDENED CHAIN CLOSER

BACKGROUND OF THE INVENTION

The inspiration of my invention was caused by what I felt was a lack of adequate theft protection for trailers available on the market. As a security specialist, I was confronted with finding a suitable means of protecting tool and utility trailers which I use in my trade as a locksmith and safesmith. I was frustrated to find that everything on the market was either overpriced and bulky, or simply not rugged enough for my intended use. This predicament is what spawned my decision to create my own trailer wheel rim locks.

After much experimentation I determined that unlike the hollow tubing and flat stock used in most all other trailer wheel rim locks, 1¼ inch diameter solid hardened steel round stock was the material to use.

I also determined through experimentation that solid hardened steel jaws (1¼" thick round solid steel) had a far better resistance to physical attack than the hollow steel, flat stock, composite, or aluminum counter parts.

I also determined that solid hardened steel jaws (1¼' thick round solid steel) held in place on the trailer wheel rim better than the hollow steel, flat stock, composite, or aluminum counterparts when someone actually tried to drive the trailer away with the trailer wheel rim lock in place.

I also experimented with different ways and means of locking the hardened steel jaws together. I determined that the simplest way of accomplishing this was to use heavy duty hardened chain.

I determined that when fixed to one jaw and wrapped around the other jaw, (please see sheet 5/5, FIGS. 16 & 17) the chain then could be doubled back and padlocked to itself, forming a secure means of keeping the hardened jaws held together and therefore, locked tightly to the trailer wheel rim. This locking procedure is very quick and easy to do. And requiring no tools, special or otherwise.

Also by using a padlock as a means of locking, the trailer wheel rim lock design can accommodate many different possible keying situations, since most any brand of padlock could be used.

Another draw back I determined to many of the existing trailer wheel rim locks, was their inability to adjust and fit securely on many different types and sizes of trailer, and non-trailer uses such as motorcycle, and automotive wheels. Whereas, my trailer wheel rim lock design will accommodate many different types and sizes of wheels and rims, and also many other non-trailer uses such as holding security gates together and locking construction equipment together. Examples being: the locking of handles of mixers and generators to larger equipment such as bulldozers and back hoes.

Also with my trailer wheel rim lock design I determined that when you lock my trailer wheel rim lock onto a wheel rim and for some reason it doesn't fit tightly, all you have to do is to remove the padlock and 'twist' the chain until the jaws are tightly held to the trailer wheel rim and then snap the padlock back in place. The pad lock will keep the chain from untwisting and therefore won't allow the wheel rum lock to be manipulated and removed by force.

BRIEF SUMMARY OF THE INVENTION

To summarize; I feel that my trailer wheel rim lock design is unique in the sense that it solves the problem of finding a trailer wheel rim lock that is made of solid hardened round 1¼" dia. steel, which is rugged, yet simple to use. It is also versatile. Not limiting itself to just locking trailer wheel rims, but can be used for locking many other large items together. My trailer wheel rim lock design also allows for most any keying combination to be used because of the trailer wheel rim locks ability to accommodate the use of many types of padlocks. High security and standard.

Also by using chain as the closer device, in my trailer wheel rim lock design, it can be 'twisted' making the trailer wheel rim lock fit very securely to the wheel, and not allowed to be manipulated like other trailer wheel rim locks on the market.

BREIF DESCRIPTION OF THE SEVERAL VIEWS OF THE DRAWING

Sheet 1 of 5, FIG. 1: Shows the trailer wheel rim lock as viewed from the left side.

Sheet 1 of 5, FIG. 2: Shows the trailer wheel rim lock as viewed from straight on.

Sheet 1 of 5, FIG. 3: Shows the trailer wheel rim lock as viewed for the right side.

Sheet 2 of 5, FIG. 4: Shows the exploded straight on view of the trailer wheel rim lock.

Sheet 3 of 5, FIG. 5: Shows dimensions of part 1

Sheet 3 of 5, FIG. 6: Shows dimensions of part 2

Sheet 3 of 5, FIG. 7: Shows dimensions of part 3

Sheet 3 of 5, FIG. 8: Shows dimensions of part 4

Sheet 3 of 5, FIG. 9: Shows dimensions of part 5

Sheet 3 of 5, FIG. 10: Pictures the protective rubber end cap. Listed as part 6.

Sheet 3 of 5, FIG. 11: Pictures the protective rubber end cap. Listed as part 7.

Figure 12:
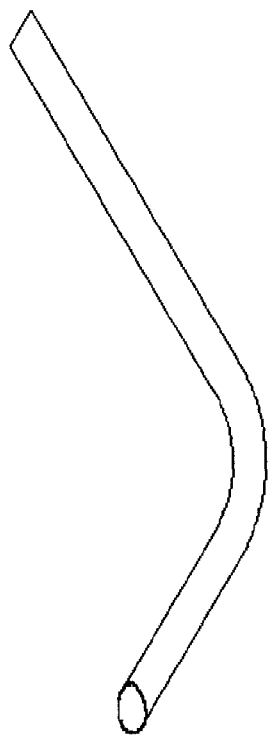

Sheet 4 of 5, FIG. 12: Shows dimensions of part 8.

Figure 13:
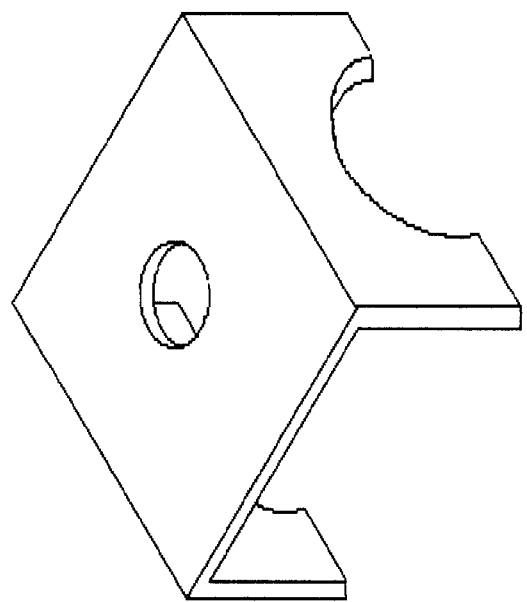

Sheet 4 of 5, FIG. 13: Shows dimensions of part 9.

Figure 14:

Sheet 4 of 5, FIG. 14: Shows dimensions of part 10.

Figure 15:

Sheet 4 of 5, FIG. 15: Shows dimensions of part 11.

Figure 16:
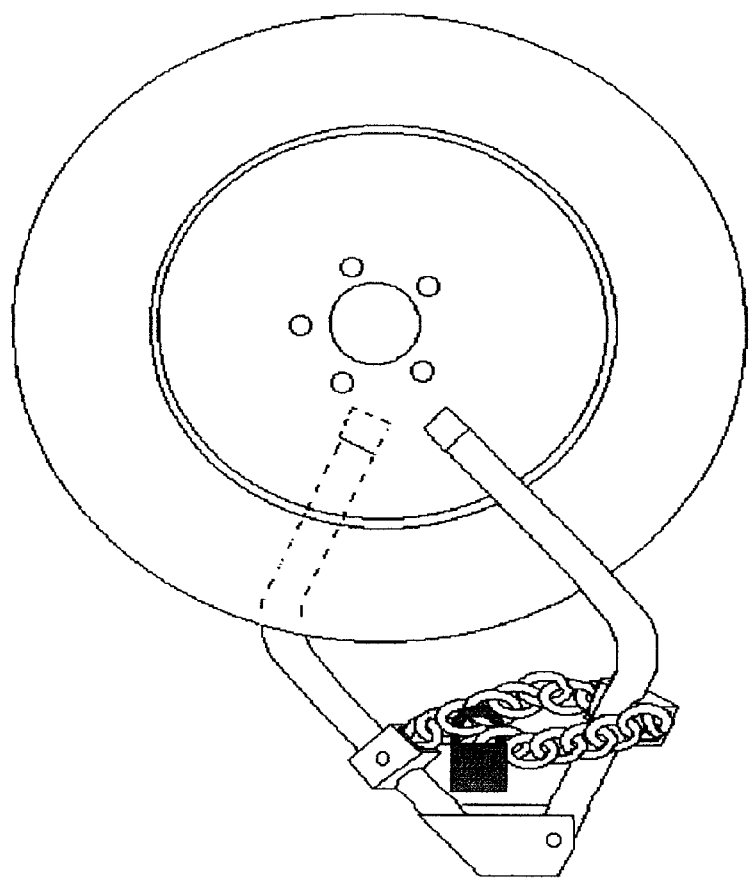

Sheet 5 of 5, FIG. 16: Shows trailer wheel rim lock device (secured with padlock) in place on wheel as viewed from the side.

Figure 17:
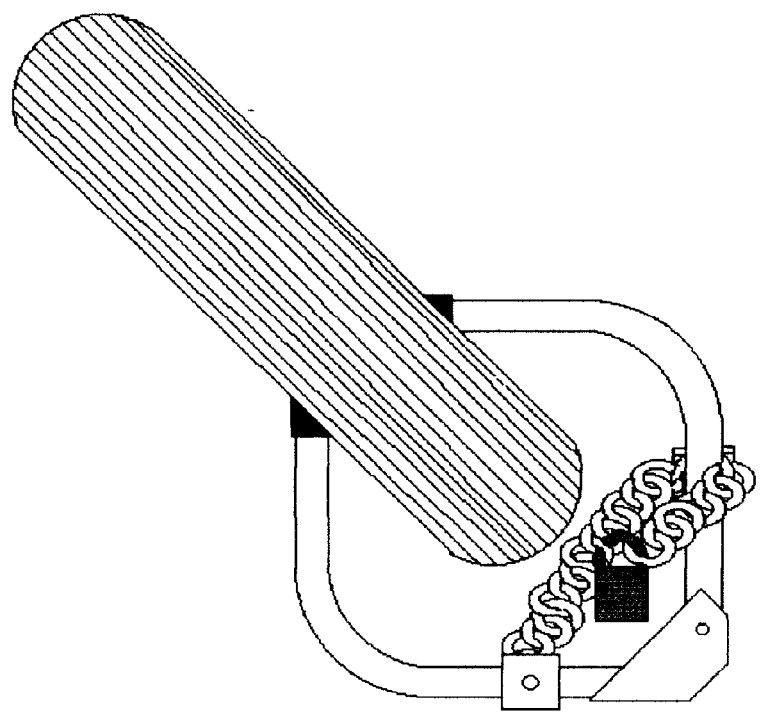

Sheet 5 of 5, FIG. 17: Shows trailer wheel rim lock device (secured with padlock) in place on wheel as viewed from above.

DETAILED DESCRIPTION OF THE INVENTION

My invention's parts breakdown is described as follows:

It is a trailer wheel rim lock which uses two pieces of solid 1¼ inch thick by 25 inches long round hardened steel material, which is bent 90 degrees into an 'L' shape (see part 5 and 8 in FIG. 4 on exploded view drawing sheet 2/5). The 90 degree bend on each piece occurs at a position 9 inches from one end of each jaw piece. The 90 degree bend is achieved by the use of a 16 ton hydraulic pipe bender.

One of the two bent jaw pieces of 1¼ inch by 25 inch long solid round hardened material is then drilled (see part 5 in FIG. 4 on exploded view drawing sheet 2/5) with a ½ inch diameter carbide drill bit completely through it, a distance of 1 inch from the from the long end of the piece. This hole will be used for the hardened hinge pin (part 3 in FIG. 4 on exploded view drawing sheet 2/5).

The top and bottom binge plates are made up of two pieces (see parts 1 and 2 in FIG. 4 on the exploded view drawing sheet 2/5) of ¼ inch thick by 3 inches wide by 6 inches long steel which are cut and angled to form the top and bottom jaw hinge plates. Both plates are drilled once with a ½ inch diameter drill bit completely through both. These holes will be used for the hardened hinge pin.(part 3 in FIG. 4 on exploded view drawing sheet 2/5).

The distance of the holes from the 90 degree angle side of the hinge plates is, 1 inch up from the bottom edge and 1½ inches in from the left side (see parts 1 and 2 in FIG. 4 on the exploded view drawing sheet 2/5). (see FIGS. 5 and 6 on the parts detail sheet 3/5, for angles and dimensions).

The hardened chain (part 11 in FIG. 4 on exploded view drawing sheet 2/5) is ⅜ inch diameter by 18 inches long (13 links) grade 5 hardened steel or Boron chain of the same dimensions.

The function of the chain anchor block (part 9 in FIG. 4 on exploded view drawing sheet 2/5) is to permanently secure by the way of a swaged pin (part 10 in FIG. 4 on exploded view drawing sheet 2/5), one end of the hardened chain to the fixed jaw (part 8 in FIG. 4 on exploded view drawing sheet 2/5). (see FIG. 13 on parts detail sheet 4/5, for dimensions of the chain anchor block).

The function of the chain guide block (see part 4 in FIG. 4 on the exploded view drawing sheet 2/5) which is made of hot formed steel, is to provide a secure means of capturing and holding the chain onto the hinged jaw, so the chain can not be manipulated in such a manner as to allow the forced removal of the trailer wheel rim lock.(see FIG. 8 on parts detail sheet 3/5, for dimensions of the chain guide block).

The rubber end caps are purchased from Niagara plastics Inc. (see parts 6 and 7 in FIG. 4 on the exploded view drawing sheet 2/5). The purpose of the protective rubber end caps is to provide mar protection to any surface which the tips of the trailer wheel rim lock would be in contact with.

Assembly of Wheel Lock (please refer to FIG. 4 in the exploded view drawing sheet #2/5)

Starting with hinge plate (part 1) lay it down on a flat surface with the longest (bottom) edge facing towards you. (drilled hole should be on left side).

Next take hinged jaw (part 5) and lay it on top of the hinge plate (part 1) so the drilled hole in the hinged jaw lines up with the hole in the hinge plate. The short 'L' end of hinged jaw should be pointing towards you and to the right. (see position of part 5).

Next take hinge plate (part 2) and lay it on top of the hinged jaw. Line up the drilled holes in the plates with the drilled hole in the hinged jaw. Parts 1 and 2 should be lined up with one another.

Next take hinge pin (part 3) and slide it down through the top hinge plate (part 2), the hinged jaw (part 5), and the bottom hinge plate (part 1). Note push the pin all the way down through so it sticks out through the bottom by ¼ inch. Flip entire unit over and swage the pin with a hammer so it can not be removed.

Next slide fixed jaw piece (part 8) between top hinge plate (part 1) and bottom hinge plate (part 2) so the long end of the 'L' of the fixed jaw is sandwiched between the long angle of the hinge plate. The edge of the fixed jaw should be even with the edges of the top and bottom hinge plates. The short 'L' end of the fixed jaw should be pointing towards you and to the left.

Next using an electric welder, weld the bottom and top hinge plates to the fixed jaw.

Next take the unit and lay it on a flat surface so as you look at it, the hinged jaw is on the left side. Take the chain anchor block (part 9) and set it on top of the fixed jaw so that it is 6 inches on center from the welded end of the jaw. Weld it securely in place.

Next take a ½ inch diameter carbide drill bit and drill down through the center of the chain anchor and completely through the fixed jaw.

Next take the hardened chain (part 11) and slide one end link through the chain anchor block, slide it in from the left to the right.

Next take the hardened chain anchor pin (part 10) and slide it down through the ½ inch hole in the chain anchor block and the fixed jaw, thus capturing the chain. Flip unit over and swage the pin with a hammer.

Next with the unit still flipped over, take the chain guide block (part 4) and position it on top of the hinged jaw a distance of 8½ inches on center from the hinge pin. Weld securely in place.

Next powder coat assembled trailer rim lock unit. Install protective rubber end caps on jaw ends.

This completes the assembly process of the wheel lock. Directions on the Use and Installation of the Trailer Wheel Rim Lock (refer to View drawing sheet 1/5, FIGS. 1, 2 & 3.) Also see drawing sheet 5/5, FIGS. 16 & 17, for more views.

To use the trailer wheel rim lock, simply grab it by both jaws so that the hinge assembly (parts 1 and 2) is towards you, and the fixed jaw is in your left hand. Next, spread the jaws (parts 5 and 8) a sufficient enough distance apart to clear the wheel and rim of the vehicle which you are going to install it on.

Once it is in place, close the jaws (parts 5 and 8) on the wheel in such a manner that the wheel lock fits tightly into the lug nut (or spoke) area of the wheel.

Take the hardened chain (part 11)and slide it through the chain guide block (part 4). Now bring the hardened chain (part 11) up and over the hinged jaw (part 5). Double the hardened chain back on itself so a padlocks shackle can now be inserted through the chains links, thus securing the trailer wheel rim lock to the wheel and rim.

Note; if there is too much play between the jaws and the wheel and rim, and the trailer wheel rim lock only fits loosely on the wheel and rim, then simply remove the padlock from the hardened chain and twist the hardened chain in such a manner (either clockwise or counter clockwise) as to take up some slack in the hardened chain. Then re-install the padlock. The wheel lock will fit more tightly now. And will be less prone to any manipulation attempts at removal of the trailer wheel rim lock.

The use of a simple hardened chain and padlock, makes this trailer wheel rim lock design much more adjustable and tight fitting than previous inventions which use a straight, or curved, or scissors type of locking bar or cable and padlock.

Also the use of hardened solid steel jaws is an improvement over the hollow tubular jawed, and flat stock type trailer wheel rim locks, because of the extra strength afforded by hardened solid steel in both bending, prying, and sawing resistance.

What is claimed is:

1. A trailer wheel rim lock device for impeding movement of a trailer, comprising:
    a stationary hardened solid round L-shaped steel jaw member having one end formed as a tip with a rubber end cap thereon and an opposite end affixed to top and bottom hinge plates;
    a movable hardened solid round L-shaped steel jaw member having one end formed as a tip with a rubber end cap thereon and an opposite end having an aperture, said opposite end being received between the top and bottom hinge plates adjacent the stationary jaw member, and said aperture being aligned with an aperture in the top and bottom hinge plates to receive a hardened hinge pin;

a hardened steel chain having a first end and a second end;

a chain anchor block affixed to the stationary jaw member by a swaged pin at a position adjacent the hinge plates and having the first end of the chain affixed thereto;

a chain guide member affixed to the movable jaw member at a position adjacent the hinge plates to receive the chain therethrough; and a padlock; and wherein the jaws are placed around opposing sides of a wheel rim and the chain is passed through the guide member and tightened until the movable jaw is tightened toward the stationary jaw and the jaws are securely around the wheel rim, the second end of the chain is then padlocked to a link at an intermediate point of the chain to secure and lock the device to the wheel rim.

* * * * *